United States Patent [19]

Komine

[11] Patent Number: 5,400,173
[45] Date of Patent: Mar. 21, 1995

[54] TUNABLE MID-INFRARED WAVELENGTH CONVERTER USING CASCADED PARAMETRIC OSCILLATORS

[75] Inventor: Hiroshi Komine, Torrance, Calif.

[73] Assignee: Northrop Grumman Corporation, Los Angeles, Calif.

[21] Appl. No.: 183,013

[22] Filed: Jan. 14, 1994

[51] Int. Cl.⁶ ............................................. G02F 1/39
[52] U.S. Cl. .................................. 359/330; 359/326; 372/21; 372/23
[58] Field of Search ...................... 372/21–23; 385/122; 359/326–332

[56] References Cited

U.S. PATENT DOCUMENTS

| | | | |
|---|---|---|---|
| 3,530,301 | 9/1970 | Boyd et al. | 359/328 |
| 3,619,637 | 11/1971 | Goto | 359/328 |
| 3,983,406 | 9/1976 | Lax et al. | 359/326 |
| 4,884,277 | 11/1989 | Anthon et al. | 372/22 |
| 5,047,668 | 9/1991 | Bosenberg | 359/330 |
| 5,070,260 | 12/1991 | Wong | 359/330 |
| 5,079,445 | 1/1992 | Guyer | 359/330 |
| 5,117,126 | 5/1992 | Geiger | 359/330 |
| 5,144,630 | 9/1992 | Lin | 372/22 |
| 5,159,487 | 10/1992 | Geiger et al. | 359/330 |
| 5,296,960 | 3/1994 | Ellingson et al. | 359/330 |

Primary Examiner—John D. Lee
Attorney, Agent, or Firm—Terry J. Anderson; Karl J. Hoch, Jr.

[57] ABSTRACT

This invention converts the fixed wavelength of a laser beam into a multiplicity of spectral output beams. The conversion process is achieved by means of an arrangement of nonlinear optical crystals in which parametric interaction generates a pair of tunable output beams in each crystal. The arrangement utilizes two stages of sequential (cascaded) parametric conversion which produces output radiation in the 2 to 5 micrometer spectral region from a laser with an output wavelength of 1 micrometer.

13 Claims, 5 Drawing Sheets

TUNABLE MID-INFRARED WAVELENGTH CONVERTER USING CASCADED PARAMETRIC OSCILLATORS

FIELD OF THE INVENTION

This invention relates generally to the field of optical devices, and particularly to a series of two cascaded optical parametric oscillators for generating mid-infrared radiation.

BACKGROUND OF THE INVENTION

Parametric devices are used for coherent light amplification, for the generation of coherent light at frequencies where no lasers are available (e.g. in the ultraviolet band) and for detection of weak light at wavelengths for which sensitive detectors do not exist. A parametric amplifier is a parametric device consisting of an optical nonlinear crystal in which power supplied by a laser in one optical frequency is translated into other parametric frequencies. A parametric amplifier can be easily modified into a parametric oscillator, which is a device that produces a coherent beam of light tunable over a wide range of wavelengths. The prior art has developed new types of crystals that may be used in optical parametric oscillators for various spectral regions. In particular, nonlinear optical crystals capable of producing parametric output in the mid-infrared region (2–5 um), which have been developed for commercial applications, include potassium titanyl phosphate (KTP), potassium titanyl arsenate (KTA), lithium niobate ($LiNbO_3$), potassium niobate ($KNbO_3$), silver gallium selenide ($AgGaSe_2$), and silver gallium sulfide ($AgGaS_2$).

It has been determined that $AgGaSe_2$ has an irregular or anomalous absorption band near 2 micrometers for light that propagates as an extraordinary wave in the crystal. An extraordinary wave may be defined as a wave whose polarization vector lies in a plane that contains the propagation direction and the symmetry axis of the crystal. One of the prior art approaches for mid-infrared generation is based upon applying a two micrometer laser to an $AgGaSe_2$ optical parametric oscillator. This results in significant absorption of the (extraordinary) pump radiation which limits the prospects for average power scaling. Indeed, severe crystal heating and thermal lensing occurs at average power levels which exceed one watt. Conversion efficiency saturates even below these power levels, thereby precluding the usefulness of $AgGaSe_2$ for many high power applications. Also, when a fixed laser is used to generate tunable waves from a $AgGaSe_2$ crystal an electric field has to be applied to the $AgGaSe_2$ crystal, or the $AgGaSe_2$ crystal has to be temperature tuned.

Reference may be had to the following patents for further information concerning the state of the prior art (all of the references are incorporated herein by reference).

U.S. Pat. No. 5,159,487, issued Oct. 27, 1992, entitled "Optical Parametric Oscillator OPO Having A Variable Line Narrowed Output" to Geiger et al. describes an optical parametric oscillator (OPO) that includes a pump laser for producing a pump beam; an optical resonator; an OPO crystal disposed within the optical resonator aligned with and responsive to the pump beam to produce a parametrically generated output; and a device external to the optical resonator for line narrowing the parametrically generated output.

U.S. Pat. No. 5,144,630, issued Sep. 1, 1992, entitled "Multiwavelength Solid State Laser Using Frequency Conversion Technique" to Lin, describes an apparatus for producing multiwavelength coherent radiations ranging from deep ultraviolet to mid-infrared. The basic laser is a pulsed Nd:YAG or Nd:YLF laser which is frequency converted by a set of novel nonlinear crystals including D-CDA, LBO, BBO, KTP and $KNbO_3$ where efficient schemes using noncritical phase matching and cylindrical focussing are employed.

U.S. Pat. No. 5,117,126, issued May 26, 1992, entitled "Stacked Optical Parametric Oscillator" to Geiger, describes a stacked OPO wherein two optical parametric crystals are coaxially disposed in a single resonator. Incident radiation is coupled to the resonator and causes parametric oscillations of the two crystals. The two crystals are independently tuned, such as by angular orientation to produce distinct components of secondary radiation.

U.S. Pat. No. 5,079,445, issued Jan. 7, 1992, entitled "High Output Coupling Cavity Design For Optical Parametric Oscillators" to Guyer, discloses a cavity design for use with a nonlinear medium which may be used as an oscillator using pump energy with frequency (FP) interacting with the nonlinear medium for parametrically generating outputs having a signal frequency (FS) and an idler frequency (FI). The parametric radiation which is produced satisfy the relationship which is common for optical parametric amplifiers and oscillators $FP = FS + FI$.

U.S. Pat. No. 5,070,260, issued Dec. 3, 1991, entitled "Ultrahigh-Resolution Optical Parametric Oscillator Frequency Measurement and Synthesis System" to Wong, discloses one or more parametric oscillators which are arranged selectively, singly, serially, and/or in parallel and each oscillator is responsive to an input pump beam having a fractional stability to produce output signals and idler beams having fractional stabilities that correspond to or are better than the fractional stability of the pump beam and in such a way that the sum of the frequencies of the output signal and idler beams of each optical parametric oscillator is constrained to be equal to the frequency of the input beam thereof.

U.S. Pat. No. 5,047,668, issued Sep. 10, 1991, entitled "Optical Walkoff Compensation In Critically Phase-Matched Three-Wave Frequency Conversion Systems" to Bosenberg, discloses a walkoff-compensated frequency conversion system such as an optical parametric oscillator including a pair of nonlinear crystals such as: Beta-Barium Metaborate, aligned in an optical cavity with their optical axis at an angle with respect to the axis of the cavity.

In U.S. Pat. No. 4,884,277, issued Nov. 28, 1989 to Anthon et al. there is disclosed an intra-cavity frequency-modified laser of improved amplitude stability which is obtained through the use of a plurality of nonlinear optical crystals within the laser cavity.

It is evident that it would be desirable to overcome the disadvantages of the prior art by providing an apparatus that utilizes a $AgGaSe_2$ crystal and a mid-infrared conversion approach without causing crystal heating and thermal lensing at average power levels exceeding one watt. Such a device should also be able to generate tunable waves from a $AgGaSe_2$ crystal by using temperature or angle tuning.

SUMMARY OF THE INVENTION

The present invention relates to a device for converting the fixed wavelength of a light beam into a plurality of spectral output beams, the device includes a first non linear optical crystal that is pumped by the light beam and in which parametric interaction near the NCPM condition generates a first output beam and a second output beam from the pumped light beam. A second nonlinear optical crystal is coupled to the first output beam and the second output beam and in which parametric interaction near the NCPM condition of the second crystal generates a third output beam and a fourth output beam from the first output beam, and the second output beam, whereby the second, third, and fourth output beams produce radiation in the 2 to 5 micrometer spectral region.

DETAILED DESCRIPTION OF THE INVENTION

General Overview

In order to provide a device which is capable of producing a mid-infrared photonic output without the problems associated in the prior art, a laser provides its output into two cascaded optical parametric oscillators for generating tunable output wavelengths in the 2 to 5 micron spectral region, as illustrated below. The first optical parametric oscillator (hereafter OPO) utilizes a KTP or KTA crystal which generates output wavelengths between 1.5 and 1.6 microns. The second OPO (which is typically a silver gallium selenide crystal) uses the first OPO to provide pump energy under non-critically phase matched (NCPM) condition.

In the above double OPO system, there is no walk-off (i.e., angular separation of pump and generated beams inside the crystal of the second OPO) and efficient conversion of the beam can be obtained. The KTP or KTA crystal in the first stage of the optical parametric oscillator is also operated at or near the NCPM condition.

Wavelength tuning is accomplished discretely or continuously. Discrete tuning can be obtained by using a different pump laser wavelength for the KTP or KTA crystal of the first stage optical parametric oscillator. A Nd:YAG laser operating at a wavelength of 1064 nm or a Nd:YLF laser operating at a wavelength of 1047 or 1053 nm may be utilized as the pumping laser. Continuous tuning can be obtained by using a fixed pump laser wavelength and small angle tuning of the KTP or KTA crystal of the first stage of the optical parametric oscillator.

In both the discrete tuning method and continuous tuning method, the first stage optical parametric oscillator produces variable output wavelengths between 1.5 and 1.6 microns. The aforementioned variable output wavelengths yield 2 to 5 micron tuning in the second stage crystal (silver gallium selenide). Since the second OPO uses the NCPM condition, the silver gallium selenide crystal does not require angular tuning. Consequently, the second OPO resonator "mirrors" can be coated directly onto the end faces of the silver gallium selenide crystal as a monolithic device without any moving parts.

Thus, this invention converts the fixed wavelength of the laser beam into a multiplicity of spectral output beams providing tunability. This conversion process is achieved by means of a novel arrangement of nonlinear optical crystal in which parametric interaction generates a pair of tunable output beams in each crystal. In particular, an arrangement that uses two stages of sequential (cascaded) parametric conversion produces output radiation in the 2 to 5 micrometer spectral region from a laser with an output wavelength of 1 micrometer.

A significant advantage of this invention is that the pump wavelengths of approximately 1.5 to 1.6 microns avoids extraordinary-wave absorption near 2 microns in the silver gallium selenide crystals in the second OPO. Previous efforts to operate silver gallium selenide OPOs with a 2 micron pump wavelength have led to severe beam distortion due to crystal heating caused by excessive pump wave absorption. This invention overcomes the aforementioned problem and allows the operation of the above devices at higher average power levels at these wavelength. This invention provides a unique combination of design parameters and conditions that allow the use of existing crystals to generate radiation in the 4 to 5 micron region.

The combined outputs from the two cascaded OPOs yield a simultaneous triplet of tunable radiation covering the 2 to 5 micrometer spectral region. This output spectral format is useful in certain remote sensing applications: for example, laser radar and Light Detection and Ranging (hereafter LIDAR) as described below.

In LIDAR, a short laser pulse is radiated into space, and the pulse radiation is reflected from distant targets or atmospheric constituents, such as molecules, aerosols, clouds, dust, or certain solid objects. The incident laser radiation interacts with the aforementioned constituents to cause alteration in the intensity and wavelength in accordance with the strength of the optical interaction and the composition of the interacting species of the atmosphere. More reliable information related to composition and physical state of the atmosphere can be deduced from LIDAR and laser radar data as these technologies become more advanced and adaptable.

THE DISTINCT EMBODIMENTS

Figure 1:
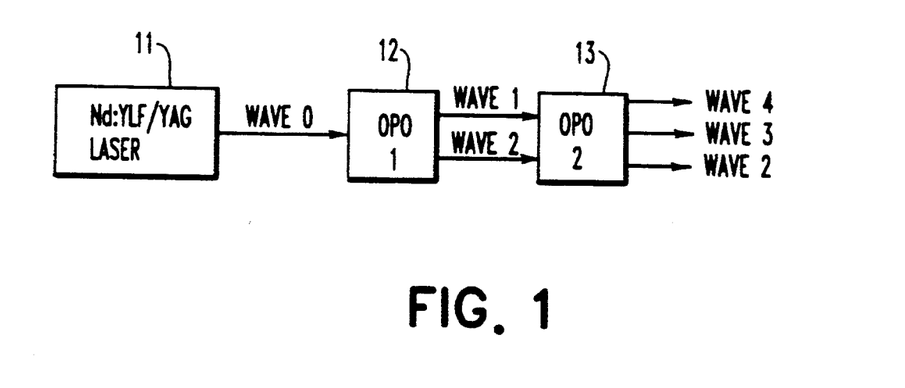
FIG. 1 is a schematic block diagram of one embodiment of the apparatus of the present invention.

Referring now to the drawings in detail, and more particularly to FIG. 1, a laser 11 is preferably a Nd:YAG laser operating at a wavelength of 1064 nm. Laser 11 operates in a continuous or pulsed mode. Historically, Nd ions in prior art host laser crystals have been utilized to provide a variety of pump wavelengths for laser 11. The output of laser 11 in the present invention is a 1 micrometer wave or beam which will be called wave 0. Wave 0 pumps a potassium titanyl (KTP) crystal (not shown-described later) that is contained within the first optical parametric oscillator (OPO) 12. A potassium titanyl arsenate (KTA) crystal may also be contained in the first OPO 12. OPO 12 uses the KTP or KTA crystal to convert its 1 micrometer input wave 0 into output wave 1 and wave 2. Wave 1 has a wavelength between 1.5 to 1.6 micrometers, and wave 2 (the idler wave) has a wavelength between 3 to 3.5 micrometers. Wave 2 is separated from wave 1 at the output of OPO 12, and is not used in a second OPO 13. Wave 1 provides the pump energy for the second OPO 13.

A silver gallium selenide (AGGaSe$_2$) crystal that is contained in the second OPO 13 uses the 1.5 micrometer wave 1 as a pump to generate a pair of simultaneous output beams, i.e., waves 3 and 4. Although wave 1 propagates in the AgGaSe$_2$ crystal as an extraordinary wave, the wave 1 radiation avoids the anomalous absorption bands of the crystal near 1.3 and 2 micrometers. Wave 3 is in the 2 to 3 micrometer range and wave 4 is in the 3 to 5 micrometer range. Since both waves 3 and 4 propagate as ordinary waves in the AgGaSe$_2$ crystal, the generated beams are not affected by the anomalous absorption bands for the extraordinary wave. The choice of wavelength in OPO 12 and OPO 13 and the orientations of the KTP, KTA and AgGaSe$_2$ crystals uniquely optimize the Conversion efficiency and avoid deleterious effects of crystal absorption. Thus, second OPO 13 utilizes tunable wave 1 to pump the AgGaSe$_2$ crystal at the non-critically phase matched (NCPM) orientation to generate tunable output waves 3 and 4 that cover the 2 to 5 micrometer range.

Under the NCPM condition, the pump and generated waves propagate colinearly in the crystal without beam walk-off because double refraction is absent for this crystal orientation. Hence, NCPM parametric amplification can occur over the entire crystal length, independent of the pump beam size, thereby yielding efficient OPO conversion even for a pump beam with a relatively low pulse energy or peak power by reducing the beam size to achieve the required beam intensity. Only waves whose oscillations are oriented in certain directions can be propagated along a crystal without having the wave undergo double refraction according to NCPM principles. If the crystal and wave are not aligned correctly (the wave is not aligned along the principal axis of the crystal) the beams formed by the wave will walk away, resulting in a shorter interaction length. The reduction in interaction length necessitates the use of a wider beam than is desirable. The rotation of the crystal alters the refractive index of the crystal. One would want to operate an OPO crystal such that the input beams are propagated along the principal axis of the crystal in order to increase the distance in which the beams interact within the crystal.

Thus, the key idea of the invention as illustrated in the FIG. 1 embodiment is to apply a tunable input radiation near 1.5 to 1.6 micrometers (wave 1) in such a manner as to produce non-critically phase matched (NCPM) parametric interaction in the AgGaSe$_2$ crystal in OPO 13. The variation of the input wavelength generates different pairs of 2 to 5 micrometer output wavelengths in a AgGaSe$_2$ crystal cut for NCPM conditions. OPO operation near the NCPM condition is an important feature because efficient, tunable conversion can be achieved without Poynting vector walk-off effects which reduce parametric gain and efficiency in critically phased matched interaction. Although angle tuning, including the NCPM condition, has been demonstrated in AgGaSe$_2$ with a fixed pump wavelength, NCPM OPO output wavelength tuning by pump wavelength tuning is a novel approach for AgGaSe$_2$. This approach also avoids the 2 micrometer absorption problem in AgGaSe$_2$.

Figure 2:
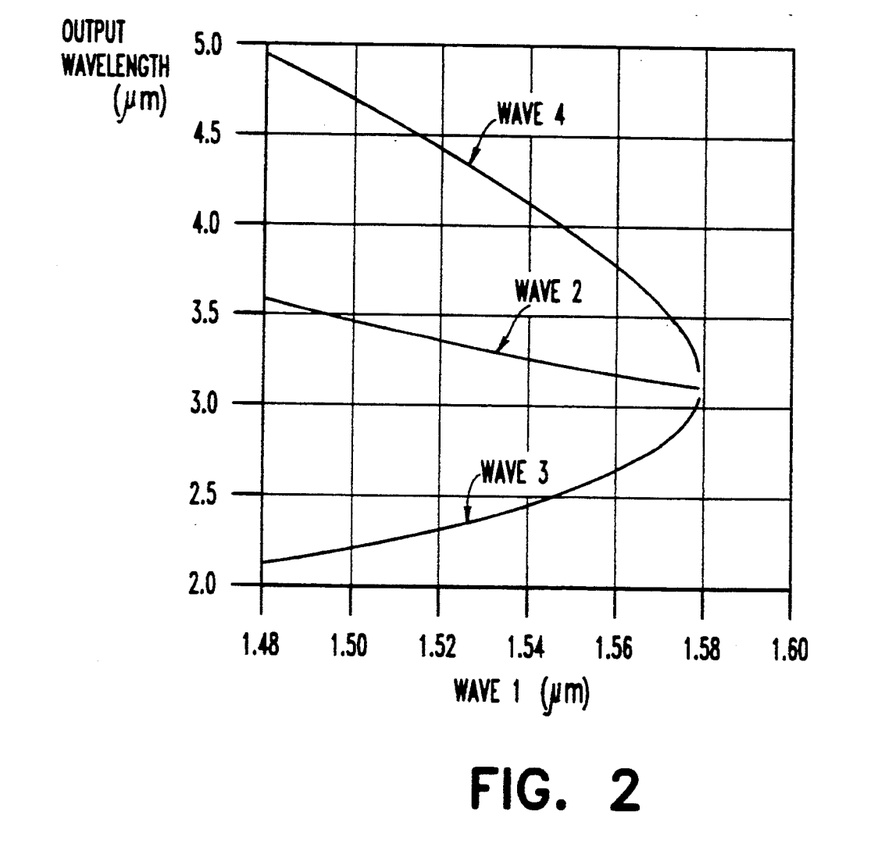
FIG. 2 is a graph of the calculated tuning range of wave 2, wave 3 and wave 4 of the device of FIG. 1 as a function of wave 1 wavelength for the case of a pump laser wavelength (wave 0) at 1047 nm.

FIG. 2 is a graph illustrating the calculated tuning wavelength ranges of wave 2, wave 3, and wave 4 as a function of wave 1 wavelength for the case of a pump laser wavelength (wave 0) at 1047 nm. The choice of other pump laser wavelengths (1053 and 1064 nm) yields a slightly longer wavelength for wave 2 at a given wave 1 wavelength. The tuning curves represent approximate wavelengths based on published refractive index data.

Figure 3:
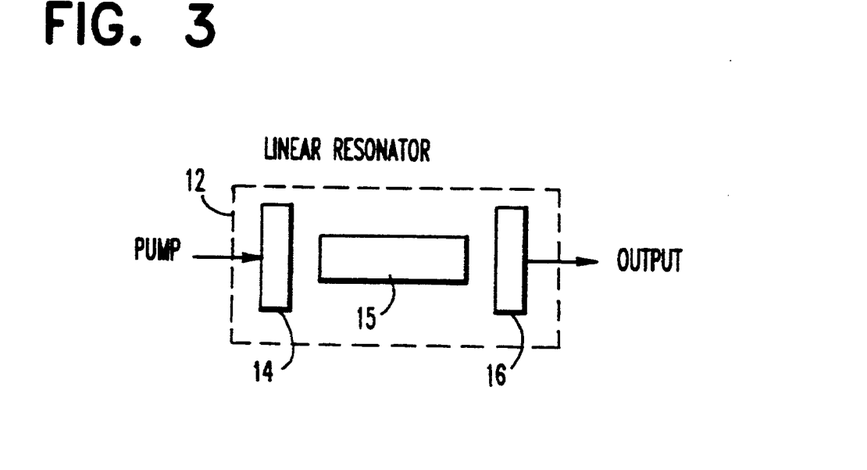
FIG. 3 is a diagram showing one optical parametric oscillator 12 of FIG. 1 in greater detail.

FIG. 3 illustrates one embodiment of the optical parametric oscillator 12 of FIG. 1 in greater detail. The OPO 12 includes a high reflector 14 which is positioned adjacent to one of the ends of nonlinear crystal 15; and a partial reflector 16 that is positioned adjacent to the other end of crystal 15. Crystal 15 may be a KTP or KTA crystal. Reflector 14 and partial reflector 16 are oriented to form a linear resonator cavity which confines certain resonance frequencies of generated wave 1, while permitting some of the resonance frequencies to exit the cavity as the output.

In first. OPO 12, KTP or KTA crystal 15 is oriented for "type-II" phase matching that involves two extraordinary waves and an ordinary wave or two ordinary waves and an extraordinary wave. The propagation direction and the phase matching plane determine the polarization directions for the pump (wave 0), signal (wave 1), and idler (wave 2) radiation. For example, if the pump and signal are ordinary waves polarized along the y-axis, then the idler will be an extraordinary wave polarized in the xz-plane. Similarly, if the pump and signal are ordinary waves polarized along the x-axis, then the idler is an extraordinary wave which is polarized in the yz-plane. However, propagation in the xy-plane requires the pump and signal to be extraordinary waves polarized in the xy-plane, while the idler is an ordinary wave polarized along the z-axis. The desired wave 1 tuning range can be achieved by angle tuning in the respective phase matching planes.

Reflector 14, crystal 15 and partial reflector 16 are instrumental in the production of wave 1. The coatings on reflector 14 and reflector 15 are selected to transmit the pump wave 0 and the idler wave 2. Wave 2 is not resonated in the cavity formed by reflectors 15 and 16. If crystal 15 is KTP, absorption beyond 3.2 micrometers prevents efficient conversion. If crystal 15 is KTA, absorption is absent at 3.2 micrometers; however, the oscillation of wave 1 in the cavity is more stable when wave 2 oscillation is suppressed in the same resonator. Thus, reflector 14 transmits pump wave 0 and wave 2 and partial reflector 16 partially reflects wave 1 and transmits wave 2. Wave 1 becomes a pump beam for second stage OPO 13 previously described relative to FIG. 1 While wave 2 is not used in OPO 13. Thus, wave 2 is separated from wave 1 in OPO 12 using a dichroic beam splitter, polarizing beam splitter, or other known means for separating two beams with different wavelengths and polarizations.

Figure 4:
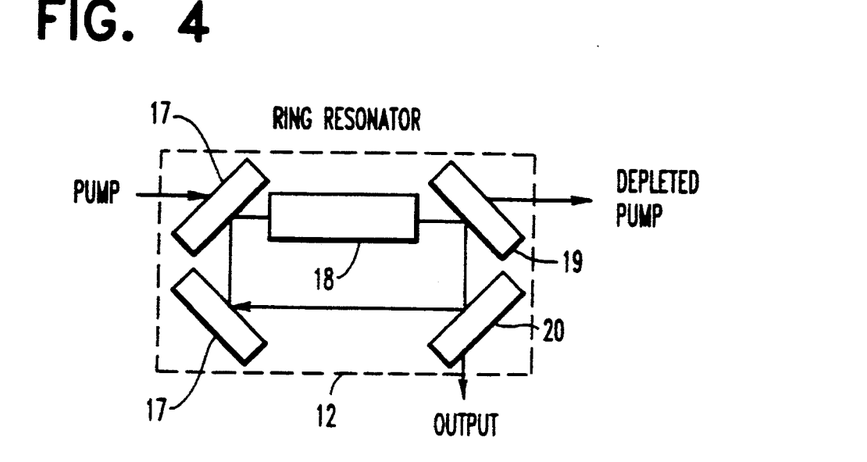
FIG. 4 is a drawing of an alternate embodiment of optical parametric oscillator 12 illustrated in FIG. 1.

FIG. 4 illustrates an alternate embodiment of the first OPO 12, which includes two high reflectors 17 which are positioned at an angle to the left end of nonlinear crystal 18, a high reflector 19 that is positioned at an angle to the right end of crystal 18, and a partial reflector 20 that is positioned at an angle to the right end of crystal 18. Crystal 18 may be a KTP or KTA crystal. Reflectors 17 and 19 and partial reflector 20 form a ring resonator cavity which confines and oscillate one of the generated waves (wave 1) at desired resonance frequencies. Partial reflector 20 can also be used to inject an external radiation for seeding the wave 1 radiation.

In OPO 12, KTP or KTA crystal 18 is oriented near one of the NCPM conditions. For angle phase matching in the xz-plane, wave 0 and wave 1 are polarized along the y-axis, while wave 2 is polarized in the xz-plane. For angle phase matching in the yz-plane, wave 0 and wave 1 are polarized along the x-axis, while wave 2 is polarized in the yz-plane. For angle phase matching in the xy-plane, wave 0 and wave 1 are polarized in the xy-plane, while wave 2 is polarized along the z-axis. The desired wave 1 turning range can be achieved by angle tuning in the respective phase matching planes. The desired wave 1 tuning range can be achieved by angle tuning or by a temperature tuning method.

Reflectors 17 and 19 and partial reflector 20 are selected partially for the wave 1 beam. The coatings on reflectors 17 and 19 transmit the pump wave 0 and the idler wave 2. Wave 2 is not resonated in the cavity formed by reflectors 17 and 19 and partial reflector 20 to optimize conversion efficiency and output amplitude stability. Thus, reflectors 17 and 19 transmit pump wave 0 and wave 2 and partial reflector 20 reflects wave 1 and transmits wave 2.

Figure 5:
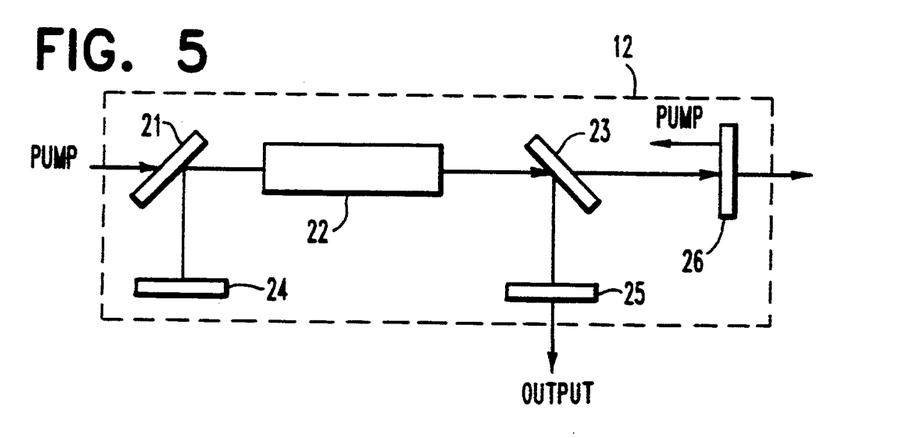
FIG. 5 illustrates yet another alternate embodiment of optical parametric oscillator 12 illustrated in FIG. 1.
Figure 6:
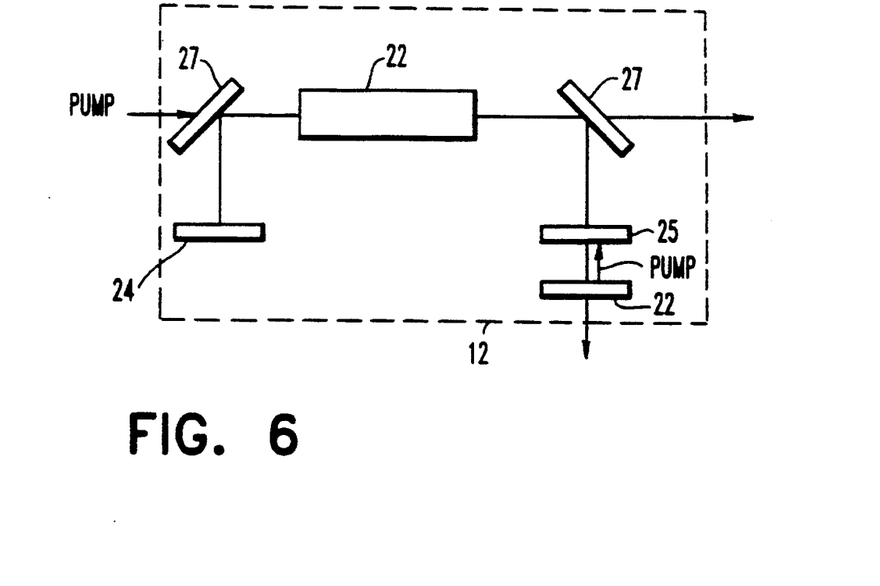
FIGS. 6 illustrates a final alternate embodiment of optical parametric oscillator 12 illustrated in FIG. 1.

FIGS. 5 and 6 represent yet another two embodiments of the OPO 12 illustrated in FIG. 1, utilizing two different methods of double-pass pump arrangement to effect bi-directional amplification in crystal 22. Crystal 22 is KTP or KTA crystal which is oriented near one of the NCPM conditions. For angle phase matching in the xz-plane, wave 0 and wave 1 are polarized along the y-axis, while wave 2 is polarized in the xz-plane. For angle phase matching in the yz-plane, wave 0 and wave 1 are polarized along the x-axis, while wave 2 is polarized in the yz-plane. For angle phase matching in the xy-plane, wave 0 and wave 1 are polarized in the xy-lane, while wave 2 is polarized along the z-axis. The desired wave 1 tuning range can be achieved by angle tuning in the respective phase matching planes.

In FIG. 5, OPO 12 includes a high reflector 21 which is positioned at an angle to the left (or input) end of nonlinear crystal 22; high reflector 23 that is positioned at an angle to the right (or output) end of crystal 22; high reflector 24 that is positioned to reflect a signal beam back on itself; partial reflector 25 that is positioned to partially reflect a signal beam back on itself; and dichroic reflector 26 that is positioned to reflect the pump beam back on itself and transmit signal output beam. Reflectors 24 and 25 form two ends of a bent resonator cavity in order to confine and oscillate signal wave 1 at certain resonance frequencies. Reflectors 21, 23 and 24 and partial reflector 25 are used for the wave 1 beam. The coatings on reflectors 21 and 23 are selected to transmit the pump wave 0 and the idler wave 2. Wave 2 is not resonated in the cavity formed by reflectors 24 and 25 in order to optimize conversion efficiency and output amplitude stability.

Reflector 26 is oriented to reflect pump wave 0 back into the cavity such that crystal 22 is pumped in the reverse direction. A signal wave 1 that is partially reflected back at reflector 25 is amplified in the reverse direction in crystal 22. Thus, the resonator oscillates the signal wave 1 with bi-direction gain.

In FIG. 6, OPO 12 includes two dual-wavelength reflectors 27 which are positioned at an angle to the left and to the right of crystal 22; high reflector 24 that is positioned to reflect a signal beam back on itself; partial reflector 25 that is positioned to partially reflect a signal beam back on itself; and dichroic reflector 26 that is positioned to reflect the pump beam back on itself and transmit signal output beam. Reflectors 24 and 25 form two ends of a bent resonator cavity in order to confine and oscillate signal wave 1 at certain resonance frequencies. The coatings on reflectors 24 and 25 are selected to transmit pump wave 0. The coatings on reflector 27 are selected to reflect both wave 0 and wave 1 and transmit wave 2. Wave 2 is not resonated in the cavity formed by reflectors 24, 27, and 25 in order to optimize conversion efficiency and output amplitude stability.

As in FIG. 5, reflector 26 in FIG. 6 is also oriented to reflect pump wave 0 back into the cavity such that crystal 22 is pumped in the reverse direction. A signal wave 1 that is partially reflected back at reflector 25 is amplified in the reverse direction in crystal 22. Thus, the resonator oscillates signal wave 1 with bi-directional gain.

Figure 7:
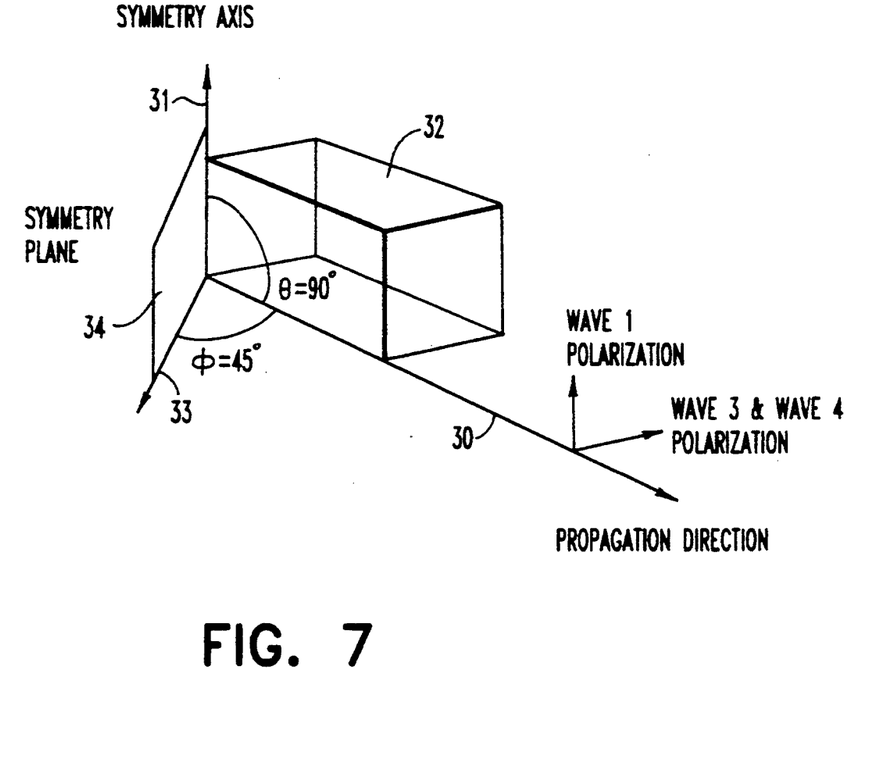
FIG. 7 illustrates the crystal geometry and polarization direction which is applicable to the second stage optical parametric oscillator.

FIG. 7 is a drawing that illustrates the crystal geometry and polarization direction for second stage optical parametric oscillator 13. OPO 13 uses a $AgGaSe_2$ crystal at the NCPM orientation. In this geometry, the beams, i.e. waves 1, 3 and 4 travel in the direction indicated by arrow 30 and propagate 90 degrees to symmetry axis 31 of $AgGaSe_2$ crystal 32 and at an azimuthal angle of 45 degrees, (arrow 33) relative to symmetry plane 34. The latter condition is chosen to maximize the nonlinear coupling coefficient for parametric interaction. Accordingly, the wave 1 polarization is parallel to symmetry axis 31, and the generated outputs (wave 3 and wave 4) are both polarized perpendicular to symmetry axis 31. For this reason, the ordinary wave 3 or wave 4 radiation can be tuned near 2 micrometers without the influence of the absorption band which affects only the extraordinary wave.

Figure 8:
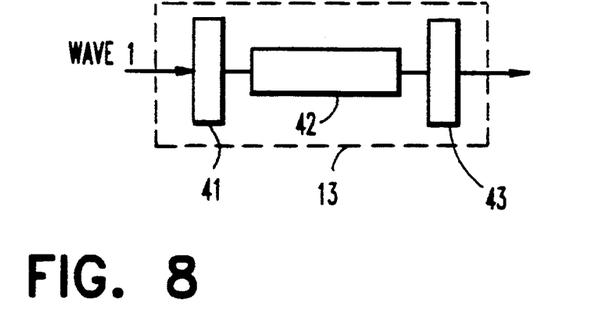
FIG. 8 is a diagram showing the optical parametric oscillator 13 of FIG. 1 in greater detail.

FIG. 8 illustrates one embodiment of the second OPO 13 of FIG. 1 in greater detail. The OPO 13 includes a high reflector 41 which is positioned adjacent to one of the ends of silver gallium selenide crystal 42 and a partial reflector 43 that is positioned adjacent to the other end of crystal 42. Reflector 41 and partial reflector 43 are positioned in a manner that they will form a linear resonator cavity in order to confine and oscillate waves at certain resonant frequencies. Reflector 41 is a high reflector for wave 3 and transmits pump wave 1, wave 2 and wave 4, and partial reflector 43 is a partial reflector for wave 3 and transmits wave 2 and wave 4. FIG. 8 may be used to confine and oscillate waves at certain resonance frequencies. Reflector 41 is a high reflector for wave 3 and transmits pump wave 1, wave 2, and wave 4. Partial reflector 43 is partial reflector for wave 3 and transmits wave 2 and wave 4.

Figure 9:
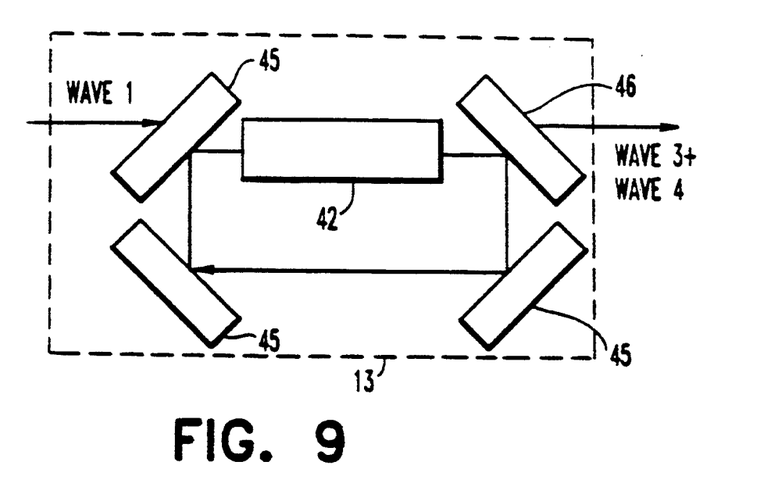
FIG. 9 illustrates an alternate embodiment of optical parametric oscillator 13 of FIG. 1.

FIG. 9 is an alternate embodiment of the optical parametric oscillator illustrated in FIG. 1. The OPO 13 includes three high reflectors 45 which are positioned at an angle to the left end of silver gallium selenide crystal 42; and partial reflector 46 that is positioned at an angle to the right end of crystal 42. Reflectors 45 and partial reflector 46 are positioned in a manner that they will form a ring resonator cavity in order to confine and oscillate wave 3 or wave 4 at certain resonance frequencies. When wave 3 is selected to oscillate in OPO 13, reflectors 45 are high reflectors for signal wave 3 and transmit pump wave 1, wave 2, and idler wave 4. Partial reflector 46 is a partial reflector for wave 3 and transmits pump wave 1, wave 2, and idler wave 4. When wave 4 is selected to oscillate in OPO 13, reflectors 45 are high reflectors for signal wave 4 and transmit pump wave 1, wave 2, and idler wave 3. Partial reflector 46 is a partial reflector for wave 4 and transmits pump wave 1, wave 2, and idler wave 3. Reflectors 45 and 47 are high reflectors for wave 3 and transmit pump wave 1 and wave 4. Partial reflector 46 is a partial reflector for wave 3 and transmits wave 4.

FIG. 9 is an alternate embodiment of the second OPO 13, which includes: three high reflectors 45 which are positioned at an angle to the left end of silver gallium selenide crystal 42; and partial reflector 46 that is positioned at an angle to the right end of crystal 42. Reflectors 45 and partial reflector 46 are positioned in a manner that they will form a ring resonator cavity in order to confine and oscillate wave 3 or wave 4 at certain resonance frequencies. When wave 3 is selected to oscillate in OPO 13, reflectors 45 are high reflectors for signal wave 3 and transmit pump wave 1, wave 2, and idler wave 4. Partial reflector 46 is a partial reflector for wave 3 and transmits pump wave 1, wave 2, and idler wave 4. When wave 4 is selected to oscillate in OPO 13, reflectors 45 are high reflectors for signal wave 4 and transmit pump wave 1, wave 2, and idler wave 3. Partial reflector 46 is a partial reflector for wave 4 and transmits pump wave 1, wave 2, and idler wave 3. Reflectors 45 and 47 are high reflectors for wave 3 and transmit pump wave 1 and wave 4. Partial reflector 46 is a partial reflector for wave 3 and transmits wave 4.

Figure 10:
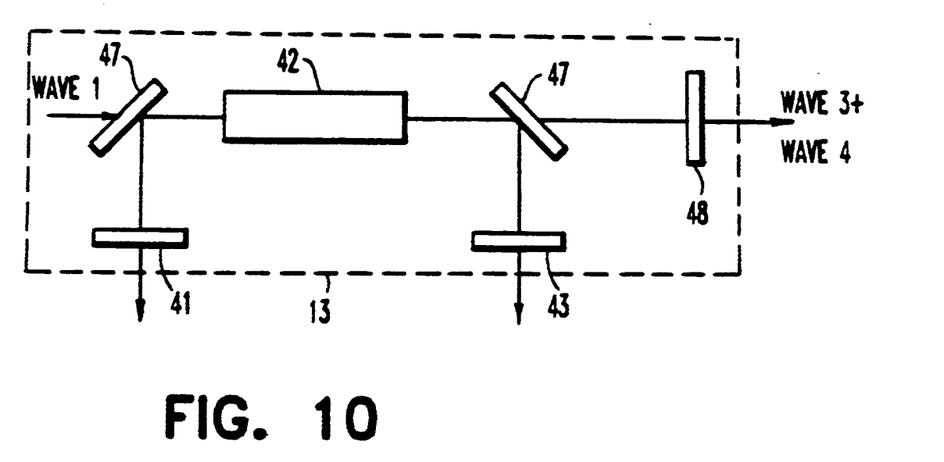
FIG. 10 illustrates a final alternate embodiment of optical parametric oscillator 13 of FIG. 1.

FIG. 10 represents yet another embodiment of the optical parametric oscillator illustrated in FIG. 1. OPO 13 resonator cavity utilizes a double pass pump arrangement to effect bi-directional amplification in crystal 42. In FIG. 10, crystal 42 is silver gallium selenide crystal which is oriented at the NCPM conditions. Pump wave 1 is polarized along the symmetry axis (theta=90 degrees) and propagates in a plane perpendicular to the symmetry axis and along a direction that is 45 degrees from a crystal symmetry plane. Wave 3 and wave 4 propagate colinearly with wave 1 and are polarized perpendicular to the symmetry axis.

In FIG. 10, OPO 13 includes high reflector 47 which is positioned at an angle to the left (or input) end of nonlinear crystal 42; high reflector 47 that is positioned at an angle to the right (or output) end of crystal 42; high reflector 41 that is positioned to reflect a signal beam back on itself; partial reflector 43 that is positioned to partially reflect a signal beam back on itself; and dichroic reflector 48 that is positioned to reflect the pump beam back on itself and transmit idler output beam. Reflectors 41 and 43 form two ends of a bent resonator cavity in order to confine and oscillate signal wave at certain resonance frequencies.

The resonated signal wave in OPO 13 can be chosen to be wave 3 or wave 4. If wave 3 is selected to oscillate in the cavity, then wave 3 is the signal wave, and wave 4 is the idler wave that does not oscillate in the cavity. If wave 4 is selected to oscillate in the cavity, then wave 4 is the signal wave, and wave 3 is the idler wave. The choice of signal and idler wave roles depends on application requirements such as spectral control and beam quality. The choice can also depend on specific coating requirements on the cavity elements. The detailed description of the reflectors in OPO 13 will assume wave 3 as signal wave and wave 4 as idler wave, however, their roles can be interchanged.

When wave 3 is selected to oscillate in OPO 13, reflectors 47, 41 and partial reflector 43 are used for the wave 3 beam. The coatings on reflectors 47 and 41 are selected to transmit pump wave 1 and the idler wave 4. Wave 4 is not resonated in the cavity formed by reflectors 41 and 43 in order to optimize conversion efficiency and output amplitude stability. Reflector 48 is oriented to reflect pump wave 1 back into the cavity such that crystal 42 is pumped in the reverse direction. A signal wave 3 that is partially reflected back at reflector 43 is amplified in the reverse direction in crystal 42. Thus, the resonator oscillates the signal wave 3 with bi-directional gain. Reflector 48 is coated to reflect pump wave 1 and transmit idler wave 4.

Figure 11:
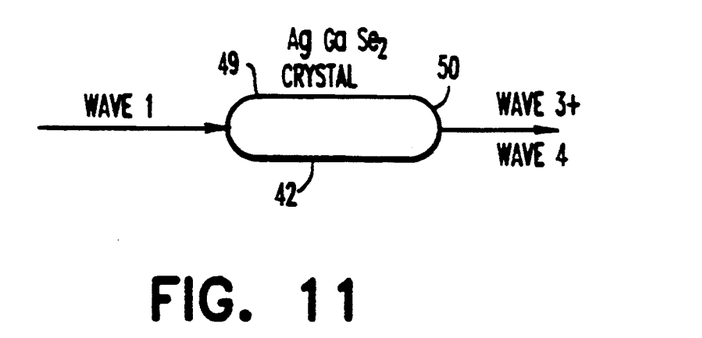
FIG. 11 illustrates one embodiment of a resonator that can be integrated onto the crystal shown in FIGS. 8, 9 and 10.

FIG. 11 illustrates a resonator that can be integrated onto the crystal using a linear cavity configuration as shown in FIG. 7. The left (input) end of the crystal 42 is a curved surface 49 with a convex spherical radius of curvature to the left. The right (output) end of the crystal is a curved surface 50 with a convex spherical radius of curvature to the right. Surfaces 49 and 50 are oriented to be perpendicular to the pump beam direction in crystal 42 in order to form a stable cavity that confines and oscillates a signal wave at certain resonance frequencies.

The above specification describes a new and improved tunable mid-infrared wavelength converter that uses cascaded parametric oscillators. It is realized that the above description will indicate to those skilled in the art additional ways in which the principals of this invention may be used without departing form the spirit. It is, therefore, intended that this invention be limited only by the scope of the appended claims.

What is claimed is:

1. An apparatus for converting a fixed wavelength of a light beam into a plurality of spectral output beams, said apparatus comprising:

a first nonlinear optical crystal that is pumped by the light beam and in which parametric interaction near the NCPM condition generates a first output beam and a second output beam from the pumped light beam;

a second nonlinear optical crystal that is coupled to the first output beam and the second output beam and in which parametric interaction near the NCPM condition of said second crystal generates a third output beam and a fourth output beam from the first output beam and the second output beam, whereby the second, third, and fourth output beams produce radiation in the 2 to 5 micrometer spectral region; and, first resonator means that is coupled to said first nonlinear optical crystal for tuning the first and second output beams.

2. The apparatus claimed in claim 1, wherein said first nonlinear optical crystal is selected from the group consisting of: KTP and TKA.

3. The apparatus claimed in claim 1, wherein said second nonlinear optical crystal is $AgGaSe_2$.

4. The apparatus claimed in claim 1, wherein said first resonator means is a first linear resonator means.

5. The apparatus claimed in claim 4, wherein said first linear resonator means comprises:
- a high reflector that is positioned adjacent to one of the ends of said first nonlinear optical crystal, said high reflector reflecting the first output beam and transmitting the light beam and second output beam; and
- a partial reflector that is positioned adjacent to the other end of said first nonlinear optical crystal, said partial reflector partially reflecting the first output beam and transmitting the second output beam.

6. The apparatus claimed in claim 1, wherein said first resonator means is a first ring resonator means.

7. The apparatus claimed in claim 6, wherein said first ring resonator means comprises:
- a first high reflector that is positioned at an angle to one of the ends of said first nonlinear optical crystal;
- a second high reflector that is positioned at an angle to one of the ends of said first nonlinear optical crystal;
- a third high reflector that is positioned at an angle to one of the ends of said first nonlinear optical crystal, said first, second, and third reflectors reflecting the first output beam and transmitting the light beam and the second output beam; and
- a partial reflector that is positioned at an angle to the remaining end of said first nonlinear optical crystal, said partial reflector reflecting the first output beam and transmitting the second output beam.

8. The apparatus claimed in claim 1, further including:
- second resonator means that is coupled to said second nonlinear optical crystal for tuning the third and fourth output beams.

9. The apparatus claimed in claim 8, wherein said second resonator means is a second linear resonator means.

10. The apparatus claimed in claim 9, wherein said second linear resonator means comprises:
- a high reflector that is positioned adjacent to one of the ends of said second nonlinear optical crystal, said high reflector reflecting the third output beam and transmitting the second and fourth output beams; and
- a partial reflector that is positioned adjacent to the other end of said second nonlinear optical crystal, said partial reflector partially reflecting the third output beam and transmitting the fourth output beam.

11. The apparatus claimed in claim 8, wherein said second resonator means is a second ring resonator means.

12. The apparatus claimed in claim 11, wherein said second ring resonator means comprises:
- a first high reflector that is positioned at an angle to one of the ends of said second nonlinear optical crystal;
- a second high reflector that is positioned at an angle to one of the ends of said second nonlinear optical crystal;
- a third high reflector that is positioned at an angle to one of the ends of said second nonlinear optical crystal, said first, second and third reflectors reflecting the third output beam and transmitting the fourth output beam; and
- a partial reflector that is positioned at an angle to the remaining end of said second nonlinear optical crystal, said partial reflector reflecting the third output beam and transmitting the fourth output beam.

13. The apparatus claimed in claim 1, wherein said second nonlinear optical crystal has curved ends with coated surfaces for tuning the third and fourth output beams.

* * * * *